US008651393B2

(12) United States Patent
Kral et al.

(10) Patent No.: US 8,651,393 B2
(45) Date of Patent: Feb. 18, 2014

(54) REPAIR INSERT FOR REPAIRING METALLIC STRUCTURE

(75) Inventors: Richard F. Kral, North Riverside, IL (US); Shane A. Mayhill, Crete, IL (US); David P. Workman, Dublin, OH (US)

(73) Assignee: Holland, L.P., Crete, IL (US)

(*) Notice: Subject to any disclaimer, the term of this patent is extended or adjusted under 35 U.S.C. 154(b) by 834 days.

(21) Appl. No.: 12/661,965

(22) Filed: Mar. 26, 2010

(65) Prior Publication Data

US 2011/0233293 A1 Sep. 29, 2011

(51) Int. Cl.
*E01B 5/00* (2006.01)

(52) U.S. Cl.
USPC ............... 238/122; 238/148; 219/54; 219/55

(58) Field of Classification Search
USPC ............ 238/119, 122, 148, 149, 151; 219/54, 219/55
See application file for complete search history.

(56) References Cited

U.S. PATENT DOCUMENTS

| | | | | |
|---|---|---|---|---|
| 1,947,966 A * | 2/1934 | Begtrup | ........................... | 249/86 |
| 2,004,081 A * | 6/1935 | Ryan | ........................... | 238/244 |
| 2,059,529 A * | 11/1936 | Langford | ........................ | 238/164 |
| 2,932,863 A | 4/1960 | Ahlert | | |
| 2,937,522 A * | 5/1960 | McGaughey | .................. | 73/633 |
| 3,308,266 A | 3/1967 | Adams, Jr. | | |
| 3,495,801 A | 2/1970 | Kruger | | |
| 3,623,207 A * | 11/1971 | Zoso et al. | ....................... | 29/241 |
| 3,802,348 A * | 4/1974 | Bryan, Jr. | ........................ | 104/15 |
| 4,068,111 A * | 1/1978 | Klumpes | ..................... | 219/73.11 |
| 4,250,944 A * | 2/1981 | Moring | ............................ | 164/54 |
| 4,686,341 A * | 8/1987 | Nomura et al. | .................. | 219/54 |
| 4,875,657 A * | 10/1989 | Moller et al. | .................... | 249/86 |
| 312,645 A | 11/1990 | Moller et al. | | |
| 5,175,405 A * | 12/1992 | Karimine et al. | ............... | 219/54 |
| 5,215,139 A * | 6/1993 | Swartz et al. | .................... | 164/54 |
| 5,237,143 A * | 8/1993 | Scheuchzer | ................... | 219/635 |
| 5,307,361 A * | 4/1994 | Kahen et al. | ............. | 372/46.012 |
| 5,307,430 A | 4/1994 | Besch et al. | | |
| 5,351,516 A * | 10/1994 | Bialy | .............................. | 72/199 |
| 5,605,283 A * | 2/1997 | Lahnsteiner et al. | ......... | 238/164 |
| 5,611,234 A * | 3/1997 | Allegrucci et al. | ............. | 72/377 |
| 5,773,779 A * | 6/1998 | Morlock | .......................... | 219/54 |
| 6,125,913 A * | 10/2000 | Mulder et al. | .................. | 164/54 |
| 6,227,282 B1 * | 5/2001 | Kuster et al. | .................... | 164/54 |
| 6,396,020 B1 * | 5/2002 | Thelen et al. | ................... | 219/54 |
| 6,515,249 B1 * | 2/2003 | Valley et al. | .................... | 219/55 |
| 6,787,726 B2 * | 9/2004 | Thelen et al. | ................... | 219/54 |
| 7,168,674 B2 * | 1/2007 | McFarlane | .................... | 248/694 |

(Continued)

*Primary Examiner* — Jason C Smith
(74) *Attorney, Agent, or Firm* — Meroni & Meroni, P.C.; Charles F. Meroni, Jr.; Christopher J. Scott

(57) ABSTRACT

A rail repair insert enables repair of rails and rail-like structures. A rail defect is initially identified and removed as contained within a volumetric material portion so as to form a contoured void while maintaining continuity of the rail opposite the void. A pre-formed insert is then placed into the void thereby effecting a rail-to-insert interface. Current is driven through the interface as force directs the insert against the rail. Resistance heat and pressure weld the insert to the rail. The flash welding aspects remove oxides and other impurities from the interface, and the forge welding aspects create a robust solid state weld. Excess material, whether flash, rail, or insert-based, is removed during the finishing processes to provide a virtually seamless rail repair. The solid state weld repair insert may be used to repair any number of targeted metallic rail-like structures.

26 Claims, 14 Drawing Sheets

(56) References Cited

U.S. PATENT DOCUMENTS

| | | | |
|---|---|---|---|
| 7,213,789 B1 * | 5/2007 | Matzan | 246/169 S |
| 7,520,415 B2 * | 4/2009 | Kral et al. | 228/119 |
| 2005/0067381 A1 | 3/2005 | Coomer | |
| 2006/0266251 A1 | 11/2006 | Taylor | |
| 2011/0233293 A1 * | 9/2011 | Kral et al. | 238/122 |

* cited by examiner

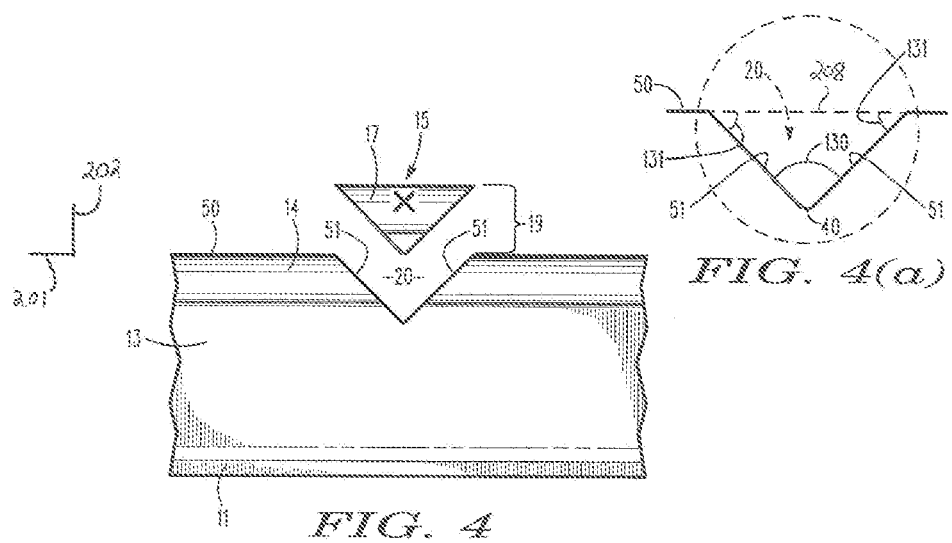
FIG. 4
FIG. 4(a)
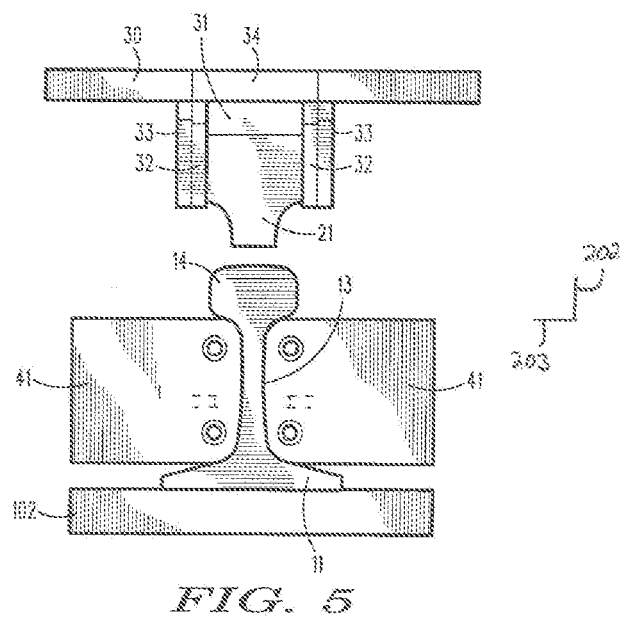
FIG. 5

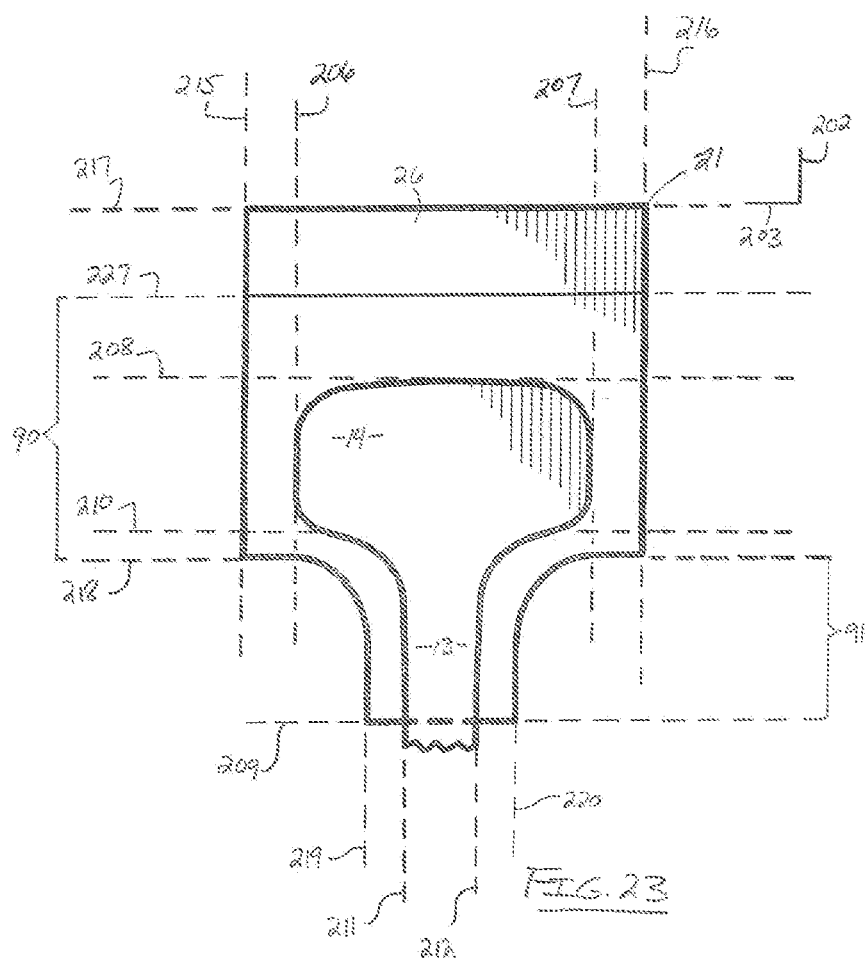

REPAIR INSERT FOR REPAIRING METALLIC STRUCTURE

BACKGROUND OF THE INVENTION

1. Field of the Invention

This invention generally relates to a repair insert for repairing targeted defect-containing metallic structure, and more particularly to a rail insert for repairing railroad rail having a localized defect in the top portion of the rail.

2. Description of Prior Art

Railroads must maintain their track to ensure safe operation of trains. Some of this maintenance centers on the repair of rail defects. Railroad rails may be manufactured with internal defects or, as a result of fatigue, develop defects. These defects are commonly located using non-destructive test methods. The Federal Railway Administration (FRA), for example, mandates periodic ultrasonic testing of railroad rails to locate defects in the rail. When a defect is found, a repair must be made to the track structure. It has been noted that many of these defects are located in the top portion of the rail or within the rail head.

There are two common welding processes used to facilitate the repair of defects in railroad rails. These processes are the thermite welding process and the flash-butt welding process. Rails repaired by a flash-butt weld are typically stronger and higher in quality than those repaired by a thermite weld. Repairs made by the thermite process are initially less costly, however, due to the relatively higher labor and equipment or components cost(s) required by the flash-butt process. Rails may also be temporarily repaired through the use of joint bar splices. Overall rail integrity is best maintained, however, by having the lowest number of joints (mechanical or welded) in track.

State of the art rail repair directed at repairing defects has typically involved removing a length of rail, (typically 13 to 19 feet in length) localized around the defect, from the existing rail. The removal of the rail length thus creates a significant gap in the rail. A so-called "rail plug" is then inserted in the resulting gap to make up for the bulk of the rail length removed. A weld is then made at each end of the rail plug, welding the rail plug to the existing rail, and creating a continuously welded rail.

A thermite weld can be used to weld the existing rail to the rail plug. A rail plug is cut to a length approximately two inches shorter than the length of the rail containing the defect, which is being cut out. The repair plug is placed into the gap. A sand mold is attached to both the existing rail and the rail plug around an approximate one-inch gap between the end of the existing rail and the end of the rail plug. The thermite material is contained in a crucible located immediately above the sand mold. After the mold is pre-heated, the thermite charge is ignited. The thermite charge creates molten steel, which pours into the sand mold.

As the thermite material solidifies, it forms a casting, which bonds to, and is contiguous with, both the existing rail and the rail plug. In this manner, the rail plug is welded to the existing rail to form a continuous section. A second thermite weld is made at an approximate one-inch gap at the opposite end of the rail plug, joining the rail plug to the existing rail. The area of the rail containing the thermite weld material is not as strong as and is not of the same quality as normal rail steel. As such, the thermite welds typically require subsequent repairs in order to maintain the railroad rail in safe condition. This method also requires the repair crew to transport a rail plug to the repair site and the section of rail containing the defect away from the site.

A flash-butt weld can also be used to weld the existing rail to the rail plug. A rail plug is cut to a length approximately three inches longer than the length of the rail containing the defect, which is being cut out. Rail anchors are removed from the existing rail until the gap created by the removal of the defect containing rail plug is three inches longer than the defect containing rail plug. This can only occur when the current rail temperature (CRT) is below the neutral rail temperature (NRT). The rail plug is put in to the gap created by the removal of the defect containing rail plug and gap growth created by the removal of anchors.

The rail ends to be welded are aligned. A flash-butt weld welderhead is clamped across the abutment of the rail plug and the existing rail, and the flash-butt welding cycle is carried out. The welderhead passes a high current across the interface between the existing rail and the rail plug. The current produces arcing between the mating surfaces. As the cycle progresses and sufficient heat has been generated, the welderhead forges the two pieces of rail together to essentially form a single continuous rail. A shear die is then pushed across the weld to return the weld profile to the rail contour. The flashing away of the rail and the forging of the rail consume about one and one half inches of rail from the rail and the rail plug.

The rail ends at the other end of the rail plug are aligned. The flash-butt welderhead is moved to the other end of the rail plug and clamped across the abutment of the rail plug and the existing rail. The rails are stretched to close the gap (which was generated by the making of the initial weld and subsequent moving the rail plug) and the flash-butt weld cycle is carried out. Rail anchors are then replaced on to the existing rail. As such, the flash-butt welding process is typically more costly than the thermite process. This method also requires the repair crew to transport a rail plug to the repair site and the section of rail containing the defect away from the site.

Regardless of the repair weld process used, there is a need to maintain the NRT. The NRT is the temperature at which the rail contains no longitudinal thermally-induced rail stresses. The track is designed to not allow the rails to contract and expand in response to environmental temperature changes. It is designed to constrain the rail and allow the rail to develop tension and compression. The amount of tension or compression is determined, in part, by the difference between NRT and the CRT.

When a repair is accomplished by installing a rail plug, it is unlikely that the rail plug installed will be of the exact length necessary to maintain the NRT of the rail, and the NRT of the rail is thus altered. As such, the segment will have a different NRT than desired. Notably, management of the NRT could be simplified if no rail length is removed during the repair of a defect in the rail.

It is further noted that when rail plugs are installed using either the thermite weld or the flash-butt weld processes, the rail is taken out of service. Thermite welding and flash-butt welding trucks need to occupy the track. This prevents the railroad from running revenue-producing trains. The installation of a rail plug and the resulting two necessary welds uses valuable track time and this repair time needs to be kept to a minimum.

Joint bar splices are, essentially, reinforcing clamp means applied to the rail adjacent to the repair. A joint bar splice is used when there is not enough time to perform a complete repair by welding or when other repair materials are not available. A joint bar splice, by government regulation, is a temporary repair and must be replaced in about 90 days. The joint bar splice thus reduces the operational limit of the rail in the repair area.

U.S. Pat. No. 7,520,415, which issued to Kral et al. discloses a further Method of Repairing Rail, which disclosure attempted to address the noted rail repair shortcomings. The '415 patent describes a system or method comprising at least the following steps: identifying and locating a defect in the rail, removing the defect by removing material from the rail surrounding the defect in at least the head section so as to form a void and a rail void interface while maintaining continuity of the rail, filling the void with molten metal having a high carbon content and causing the molten metal and the rail void interface to bond.

The molten metal may be produced by gas shielded arc welding. The carbon content of the molten metal is near that of the rail to decrease carbon migration from the rails. High carbon welding electrode is used in the welding of high strength steel using gas shielded arc welding techniques whereby a plurality of beads of molten weld material join together rail ends or fill a slot in a rail for repair purposes. The high carbon electrode avoids producing adjacent soft and brittle areas across a weld fusion line, which results from migration of carbon from the carbon rich high strength steel to the lower carbon and highly alloyed weld deposit.

The foregoing methodology described by Kral et al., while notably superior to certain aspects of the thermite and flash-butt rail repair/welding techniques described hereinabove, nevertheless also suffers from certain shortcomings. In this regard, it is noted that the molten metal material is a dynamically active medium, which medium presents certain difficulties in (non-ideal) application scenarios. For example, if the rail is inclined in the field, the molten pool of material becomes difficult to manage, and a proper weld is often problematic to achieve without much ado.

The prior art thus perceives a need for a rail repair method that results in a rail repair having the strength and quality of the parent rail, but without adding or consuming rail. Further, the prior perceives a need for a rail repair method which reduces the total number of welds in the remaining rail. Still further, the prior art perceives a need for a rail repair method which reduces the amount of materials and equipment that must be transported to and from the repair site.

Other prior art needs include a need for a rail repair method that eliminates the use of temporary joint bar splices. The prior art further perceives a need for a rail repair method that does not necessitate the relatively costly and time-consuming removal of a section of rail. The present invention attempts to address the foregoing by providing a cost effective, time-efficient rail repair method which minimizes the amount of time that the rail is out of service to revenue-producing trains, and which method greatly reduces the manpower otherwise required to effect state of the art type repairs.

SUMMARY OF THE INVENTION

The noted needs, and others, are satisfied by the disclosed method, which provides for repairing a rail or rail-like structure having a defect using a single weld. The repair method according to the present invention begins when a rail defect is identified and located, often via use of an ultrasonic rail-testing car. Ultrasonic rail-testing is an exemplary method and/or means that can precisely locate and mark the area of the rail containing the defect, and can confirm that the defect is totally contained in the top portion of the rail head. Additionally, manual testing of the defect may further delineate the areas of the rail that contains the defect. The top portion of the rail is then removed and the resulting section is filled by resistance welding a metal insert into the void created for defect removal.

To accomplish the repair, the top portion of the rail containing the defect is accurately identified and/or located by any number of means. A specialized apparatus is then clamped to the rail, and utilizing the apparatus, a volumetric top portion of the rail containing the defect is removed. It is contemplated that the removal may be preferably accomplished by machining away a portion of the rail, for example, but other methods may be used.

Because only the top portion of the rail containing the defect is removed, there is no appreciable change in the length of the rail and the NRT remains unaffected. Because of the clamping action of the apparatus and the fact that only the top portion of the rail is removed, there is no need to accurately align two rails. The rail is held in acceptable alignment by the lower portion of the rail.

The welding head is then clamped to the rail. A pre-formed, solid state, weld repair insert is installed in the welding head and brought into position directly over the machined notch or void site. The insert is pre-machined from high quality steel that is compatible to the rail steel. The resistance welding cycle is then initiated. The welding current and platen (insert) position are precisely controlled to first preheat the rail and insert and then flash clean the surfaces to be welded. Finally, the insert is forged in to the rail to create the welding bond.

Because the rail repair is accomplished without using a rail plug, there is no need to transport rail plugs to or away from the repair site. Additionally, the NRT of the original rail is maintained as no additional rail or materials are or even can be added or removed from the existing rail length. Because only a single weld is required, and the insertion of a rail plug is not required (as compared to other prior methods requiring two welds and plug exchange), the disclosed repair method is more time efficient than prior repair methods.

Given that the repair method is typically faster and does not require additional rail or materials, this method of repair can be performed instead of using a joint bar splice. The repair can be accomplished in the same track occupation as required by the detector car, thereby allowing more time of the running of revenue-producing trains. Moreover, the material characteristics and the process used to deposit the fill material can provide a repair structure which has the properties equaling those of the rail material and far surpassing those of the thermite weld.

BRIEF DESCRIPTION OF THE DRAWINGS

Other features of our invention will become more evident from a consideration of the following brief description of patent drawings:

FIG. 4 is a side elevational view of a fragmentary rail length showing the marked volumetric upper rail portion otherwise depicted in FIG. 3 being removed.

FIG. 4(a) is an enlarged fragmentary view as sectioned from FIG. 4 depicting the angled surfaces of the void site with a beveled valley therebetween.

FIG. 5 is a longitudinal or axial view of a rail length as supported by generic support structure, and engaged with certain elements of a rail bus assembly in inferior adjacency to certain elements of an insert bus assembly as outfitted with a repair insert.

FIG. 23 is an enlarged fragmentary of the structures otherwise depicted in FIG. 15(c) presented to show the structures in greater detail.

DETAILED DESCRIPTION OF THE PREFERRED EMBODIMENT/METHODOLOGY

Figures 1, 1A:
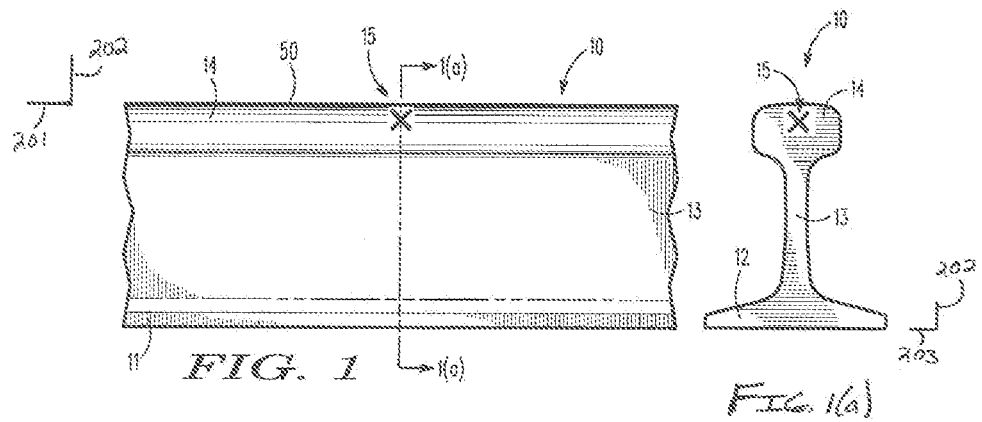
FIG. 1 is a side elevational view of a fragmentary rail length having a defect in the rail head as generically marked with an "X".
FIG. 1(a) is transverse sectional view of the rail length otherwise depicted in FIG. 1 as sectioned through the defect.

Referring now to the drawings with more specificity, the reader is directed to FIG. 1, which figure depicts a side elevational view of a fragmentary rail section or length as referenced at 10. A rail length 10 is typically formed having a rail base portion 11 with opposed flanges 12, an upstanding rail web portion 13 extending upward from the base portion 11 between the flanges 12, and a rail head portion 14 at the top of the rail web portion 13 as generally and comparatively depicted in FIGS. 1 and 1(a).

The repair system or method according to the present invention effectively begins when a rail defect 15 is identified and located, such as by way of ultrasonic rail-testing. Ultrasonic rail-testing can precisely locate and mark the area of rail 10 containing the defect 15. Additionally, manual testing of the defect 15 may further delineate the areas of the rail 10 which contain the defect 15. The ultrasonic testing, as exemplary defect locating means, can further confirm that the defect 15 is totally contained in the top portion or rail head 14 of the rail 10.

Further referencing FIG. 1, it will be noted that at the upper portion or head 14 of rail section 10, a generic "X" marks a defect spot or area as at 15. While it has been noted that a rail defect 15 may be preferably located by ultrasonic rail testing, it is contemplated that the rail defect 15 may be located by other rail defect identifying or locating means such as induction means, dye penetration means or other known methods of defect identification.

Figure 2:
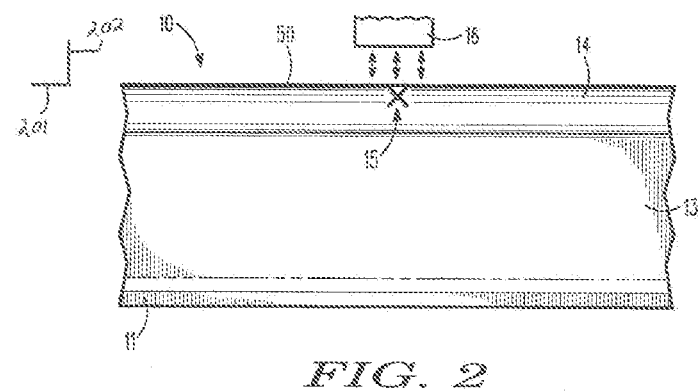
FIG. 2 is a side elevational view of a fragmentary rail length having a defect in the rail head as marked at "X", which defect is being identified and located via certain generic defect-locating means.

Typically, when the ultrasonic rail testing vehicle identifies a defect, it will mark the defect location. The defect location may be recorded on a map, or a nozzle may mark the rail, for example, with paint. Alternatively, the location of the defect may be recorded using information gathered from such sources as the global positioning system of the network of satellites. FIG. 2 attempts to depict the step of defect identification and/or location via generic defect identifying/locating means as referenced at 16.

After the defect location has been identified, a repair crew will be dispatched to the defect location. It is contemplated that the repair crew will travel to the defect location with certain means for removing material from the rail as well as certain means for welding a repair insert 21 to the rail length 10. When the repair crew arrives at the defect location, it may perform further tests to delineate the exact size of the rail defect 15. Presuming the defect 15 is of limited size and localized to a select rail portion (typically the head 14), the defect 15 may be repaired using the method according to the present invention.

Figure 3:
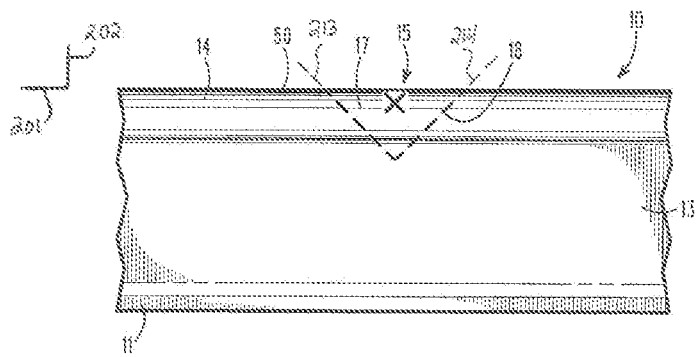
FIG. 3 is a side elevational view of a fragmentary rail length having a defect in the rail head as marked at "X", which defect has been targeted for removal as contained within a volumetric upper rail portion as depicted with broken lines.

In this regard, it is contemplated that the preferred methodology includes the removal of a wedge-shaped portion 17 from the rail length 10, which wedge-shaped portion 17 is outlined before removal and highlighted with broken lines 18 in FIG. 3. Notably, the wedge-shaped portion 17 includes, contains, or surrounds the rail defect 15. It will be seen from a comparative inspection of FIGS. 3 and 4 that the wedge-shaped portion 17 has a depth 19 sufficient to include a transverse cross-section of (a) the entire head 14 as well as (b) an upper portion of the rail web 13.

The triangular or wedge-shaped portion 17 is preferably formed so as to comprise portions of both the rail head 14 and rail web 13. In this regard, the removed wedge-shaped portion 17 preferably comprises a removed rail head portion as at 14' and a removed rail web portion as at 13'. The removed rail head portion 14' is bound by frontal plane 208' at the upper limit and frontal plane 210' at the lower limit, and the removed rail web portion 13' is bound by frontal plane 210' at the upper limit and by frontal plane 209' at the lower limit.

The triangular or wedge-shaped void or void site 20 is preferably formed in the rail length 10 or similar other targeted metallic rail-like structure such that the void 20 essentially defines a pointed, insert-receiving notch orthogonally into the rail length 10 away from the planar upper rail head surface 50. The pointed insert-receiving notch or void site 20 preferably further comprises orthogonally opposed planar void site surfaces as referenced at 51 such that the angle subtended intermediate the planar upper rail head surface 50 and the planar surfaces 51 is substantially 45 degrees, which angle is generally referenced at 131 in FIG. 4(a).

It is contemplated that the wedge-shaped portion 17 may be removed from the rail length 10 by any number of portion or material-removing means as exemplified by certain machining means (e.g. carbide-tipped machining means and electric discharge machining (EDM) means) or abrasive means. The material-removing means are operated to remove the wedge-shaped portion 17 from the rail length 10 inclusive of the defect 15. The reader may note that the process is somewhat akin to drilling out decayed dental material.

Figure 6:
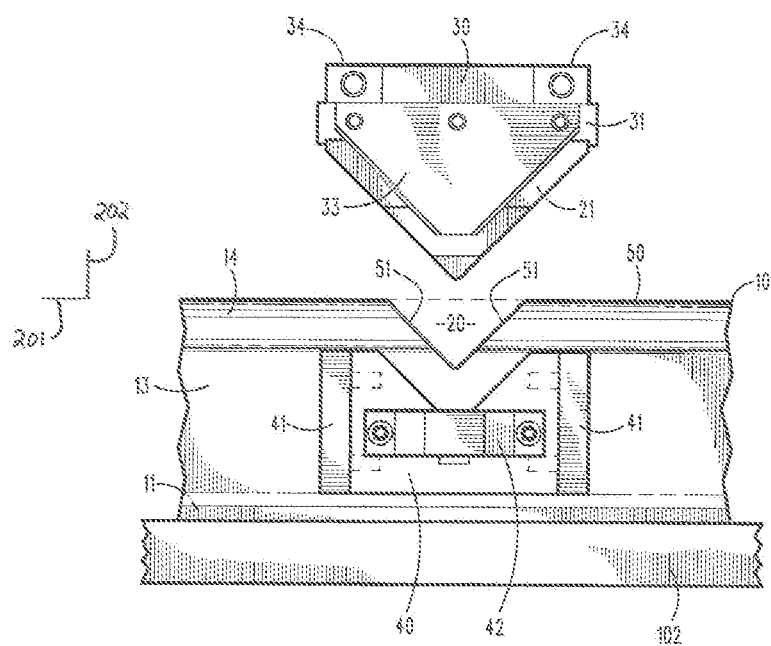
FIG. 6 is a side elevational view of the structures otherwise illustrated in FIG. 5, which view depicts a fragmentary rail length as supported by generic support structure and engaged with certain elements of rail bus assembly in inferior adjacency to certain elements of an insert bus assembly as outfitted with a repair insert.

The analogy holds true but for the fact that the material removed from the rail length 10 according to the present invention tends to be of a more pre-defined volume. In other words, whereas the removal of (healthy) dental material is generally minimized during the removal of decayed dental material, the volumetric removal of the wedge-shaped portion 17 is (substantially) pre-determined and defined to cooperate with pre-formed insert(s) having a pre-determined volume greater in magnitude than the volume of material removed or defined by the void site 20 as generally depicted in FIGS. 4 and 6.

In other words, after the wedge-shaped, defect-containing portion 17 of the rail length 10 is removed, the rail length 10 is left with a substantially wedge-shaped void site as at 20. As illustrated, an exemplary upper rail portion 17 of the rail length 10 is removed, which portion 17 preferably includes selected portions of the rail head portion 14 and rail web portion 13. Notably, the rail length 10 is not completely severed, but is still connected opposite the void site 20 as only a select (upper) portion 17 of the rail length 10 has been removed.

Because only the select (upper) portion 17 of the rail 10 is removed (i.e. that portion corresponding to the volumetric material removal) (a) there is no substantial change in the length of the rail length 10, (b) there is no need to accurately cut rail plug lengths as would be the case if a rail plug type repair were practiced, and (c) the NRT is maintained. In other words, according to the present methodology, the rail length 10, after removing the portion 17, is held to the pre-repair length.

Figure 7:
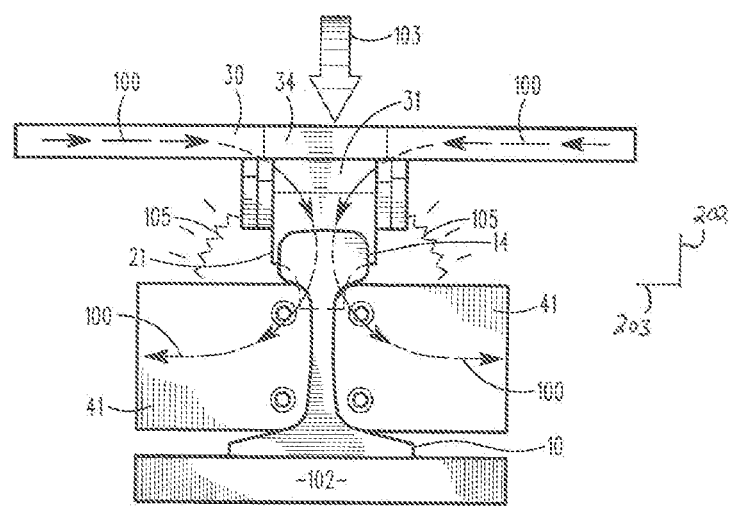
FIG. 7 is a longitudinal or axial view of the structures otherwise depicted in FIG. 5, which view depicts the rail length engaged with certain elements of the rail bus assembly and the repair insert, which repair insert is further engaged with certain elements of the insert bus assembly.
Figure 8:
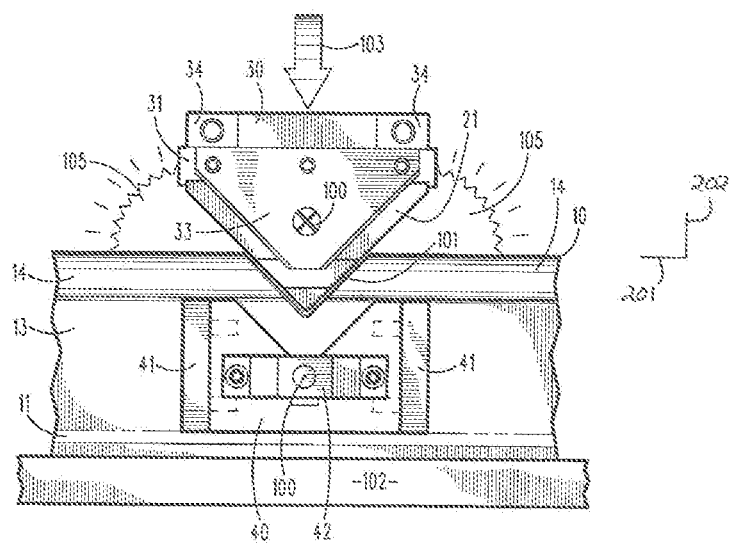
FIG. 8 is a side elevational view of the structures otherwise illustrated in FIG. 6, which view depicts the fragmentary rail length engaged with the repair insert, which repair insert is further engaged with certain elements of the insert bus assembly.

Following the removal of the wedge-shaped portion 17 from the rail length 10, a volumetric, current-conductive or solid state weld repair insert 21 is placed into the void site 20. The repair insert 21 is preferably pre-formed from a material substantially similar to the material construction of the rail length 10 (e.g. 1080 rail steel and hardened rail stock/steel, respectively). FIGS. 5 and 6 generally depict the repair insert 21 being aligned in superior adjacency to the void site 20 from longitudinal and lateral views respectively. FIGS. 7 and 8 generally depict the repair insert 21 inserted or otherwise placed into the void site 20 as further seen in respective longitudinal and lateral views.

Figures 12, 12A:
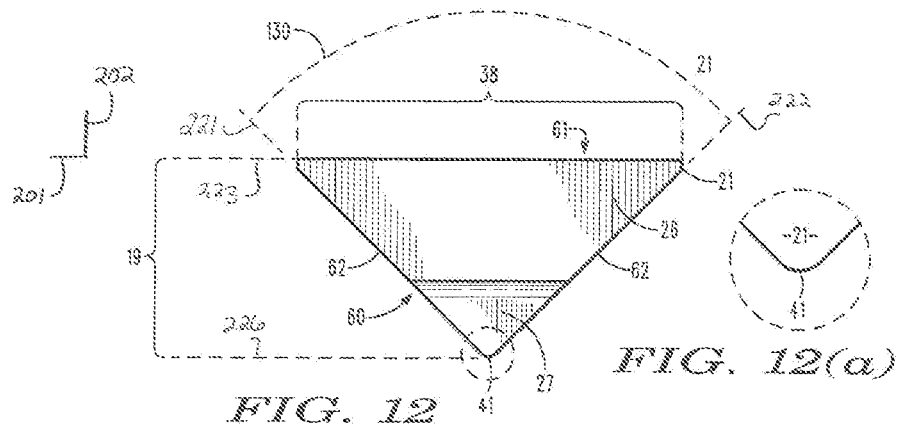
FIG. 12 is a side view of the exemplary repair insert otherwise depicted in FIG. 11.
FIG. 12(a) is an enlarged fragmentary view as sectioned from FIG. 12 depicting the angled surfaces of the repair insert with a beveled tip therebetween.
Figure 13:
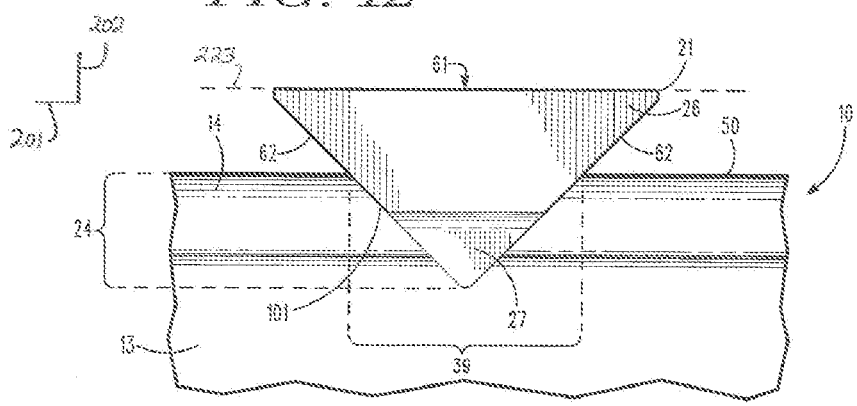
FIG. 13 is a side view of the exemplary repair insert otherwise depicted in FIGS. 11 and 12 as inserted into a void site formed in a fragmentary upper rail portion before the weld cycle is initiated.
Figure 14:
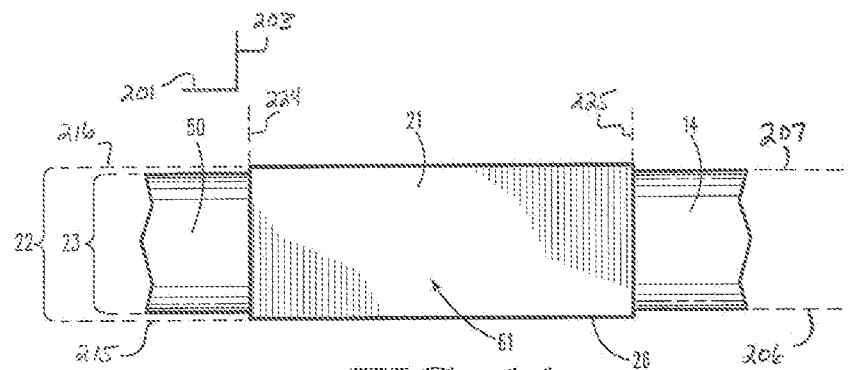
FIG. 14 is a top view of the exemplary repair insert otherwise depicted in FIGS. 11-13 as inserted into a void site formed in a fragmentary upper rail portion.
Figures 15A, 15B:
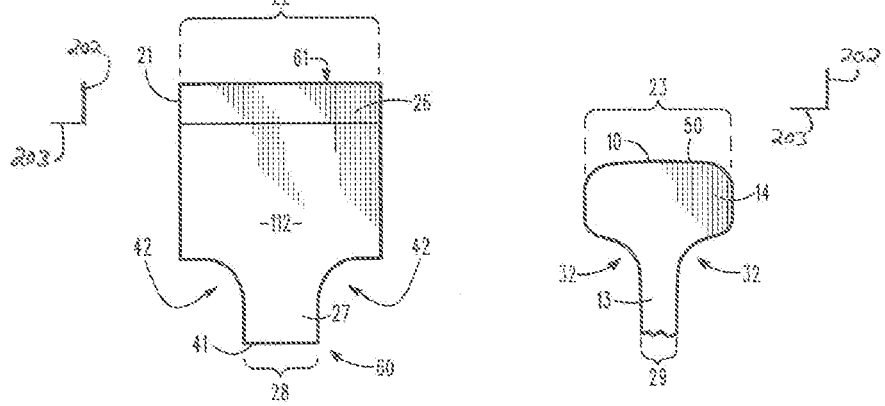
FIG. 15(a) is an end view of the exemplary repair insert otherwise depicted in FIGS. 11 and 12.
FIG. 15(b) is a longitudinal or axial view of the rail length otherwise depicted in FIGS. 13 and 14.
Figure 15C:
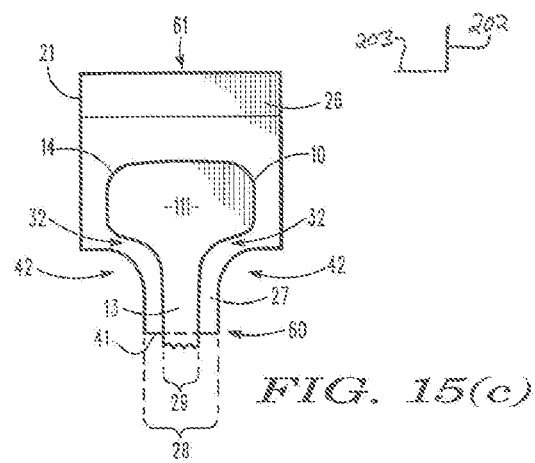
FIG. 15(c) is a longitudinal or axial view of the insert and rail structures otherwise depicted in FIGS. 13 and 14.

As generally depicted in FIGS. 14 and 15(c), it is contemplated that the width 22 of the insert 21 at its upper portion 26 is preferably slightly greater in magnitude than the width 23 of the rail head 14 to compensate for slight lateral shift(s) of the insert 21 during the ensuing welding cycle. From the lateral views, as generally depicted in FIGS. 12 and 13, the reader will note that the length 38 of the insert 21 is also greater in magnitude relative to the maximum length 39 of the upper plane of the void site 20. The reader should further note the overall depth 19 of the insert 21 exceeds the void depth as at 24.

The wedge-shaped, solid state weld repair insert 21 is preferably formed such that the insert 21 preferably has a pointed rail-opposing portion as at 60 and planar force-receiving portion as at 61. The pointed rail-opposing portion 60 thus has opposed planar insert surfaces 62, which opposed planar insert surfaces 62 are preferably and substantially orthogonal to one another and preferably intersecting at a beveled tip 41 or terminus.

The volume of the repair insert 21 is thus greater in magnitude than the effective volume of the void site 20. During the weld cycle, the material composition of the rail 10 and repair insert 21 is consumed such that the void site 20 is effectively filled with the material composition of the repair insert 21. Excess material, whether excess flash material and/or excess insert/rail material at the repair site 125, is preferably removed from the rail length 10 following the weld and optional quenching processes.

Referencing diagrammatic depictions of the three main axes set forth in the drawings, the reader will note that a first dimension may be exemplified by the plane defined by the Y axis 202 and the Z axis 203; a second dimension may be exemplified by the plane defined by the X axis 201 and the Y axis 202; and a third dimension may be exemplified by the plane defined by the X axis 201 and the Y axis 202.

It will be understood that the rail length with rail head portion 14 and rail web portion 13 is treated so as to remove a wedge-shaped portion 17 inclusive of the rail defect 15 such that the void site 20 extends into the rail head portion 14 and rail web portion 13, which rail head portion 14 and rail web portion 13 are together generally T-shaped in transverse cross-section or the first dimension.

The T-shaped void site 20 in the first dimension may be approximated or bound by certain planes. The T-shape of the void site 20 may be defined at (1) the voided rail head portion 14 extending (a) intermediate lateral planes 206 and 207 parallel to the X and Y axes 201 and 202 and (b) intermediate frontal planes 208 and 210 parallel to the X and Z axes 201 and 203; and (2) the voided rail web portion 13 extending (a) intermediate lateral planes 211 and 212 parallel to the X and Y axes 201 and 202 and (b) intermediate planes frontal planes 209 and 210 parallel to the X and Z axes 201 and 203.

It will be further understood that the void site 20 is preferably triangular in the sagittal-longitudinal cross-section or second dimension. The triangularly shaped void site 20 in the second dimension may be regarded as being approximated or bound by certain planes. The triangular-shaped aspect of the void site 20 may be defined at the voided rail head and web portions 14 and 13 extending (a) intermediate (orthogonally) oblique planes 213 and 214 and frontal plane 208 parallel to the X and Z axes.

It will be still further understood that the void site 20 is preferably rectangular in the frontal-longitudinal cross-section or the third dimension. The rectangular-shaped aspect of the void site 20 in the third dimension may be regarded as being approximated or bound by certain planes. The rectangular shape of the void site 20 may be maximally defined by (a) transverse planes 204 and 205 parallel to the Y and Z axes 202 and 203, and (b) sagittal planes 206 and 207 parallel to the X and Y axes 201 and 202.

The void site 20 thus has a maximal site depth as at 24 intermediate parallel planes 208 and 209; a maximal site width as at 23 intermediate parallel planes 206 and 207; and a maximal site length as at 39 intermediate parallel planes 204 and 205. The repair insert 21 is insertable into the void site 20 for effecting a rail-to-insert interface. The repair insert 21 is preferably similarly shaped as compared to the wedge-shaped portion 17 or void site 20, but relatively larger in volume as compared to the volume of either the wedge-shaped portion 17 or void site 20.

Accordingly, the repair insert 21 is preferably T-shaped in transverse cross-Section or the first dimension; triangular in sagittal-longitudinal cross-section or the second dimension, and rectangular in the frontal-longitudinal cross-section or third dimension. The T-shaped repair insert 21 in the first dimension may be regarded as being approximated or bound by certain planes.

The T-shape of the repair insert 21 may be defined as being bound by (1) (a) planes sagittal planes 215 and 216 parallel to the X and Y axes 201 and 202, and (b) frontal planes 217 and 218 parallel to the X and Z axes 201 and 203; and (2) (a) sagittal planes 219 and 220 parallel to the X and Y axes 201 and 202 and (b) frontal planes 209 and 218 parallel to the X and Z axes 201 and 203.

It will be further understood that the repair insert 21 is preferably and substantially triangular in the sagittal-longitudinal cross-section or second dimension. The triangularly shaped repair insert 21 in the second dimension may be regarded as being approximated or bound by certain planes. The triangular-shaped aspect of the repair insert 21 may be defined by oblique planes 221 and 222 and frontal plane 223 parallel to the X and Z axes.

It will be still further understood that the repair insert 21 is preferably rectangular in the frontal-longitudinal cross-section or the third dimension. The rectangular-shaped aspect of the repair insert 21 in the third dimension may be regarded as being approximated or bound by certain planes. The rectangular shape of the repair insert 21 may be maximally defined by (a) transverse planes 224 and 225 parallel to the Y and Z axes 202 and 203, and (b) sagittal planes 215 and 216 parallel to the X and Y axes 201 and 202.

The repair insert 21 thus has a maximal insert depth as at 19 intermediate parallel frontal planes 223 and 226, a maximal insert width as at 22 intermediate parallel sagittal planes 215 and 216; and a maximal insert length as at 38 intermediate parallel transverse planes 224 and 225. It will thus be seen that the repair insert 21 is insertable into the void site 20 for effecting a rail-to-insert interface, the repair insert 21 being preferably similarly shaped as compared to the wedge-shaped portion 17 or void site 20, but relatively larger in volume as compared to the volume of either the wedge-shaped portion 17 or void site 20.

Figure 22:
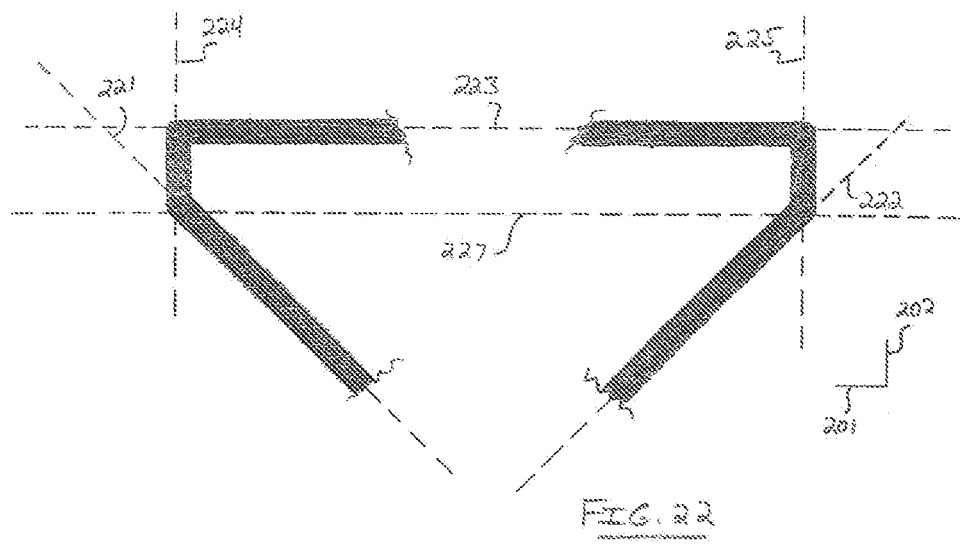
FIG. 22 is an enlarged fragmentary or diagrammatic sectional depiction of the upper left and right corners of the repair insert otherwise shown in FIG. 21 presented to show the upper portion of the repair insert in greater detail.

The upper portion 26 of the repair insert 21 may further preferably comprise a rectangular aspect in the first, second, and third dimensions as perhaps most clearly and comparatively depicted in FIGS. 14, 22, and 23. Referencing the noted figures, it will be seen that the rectangular shape of the upper portion 26 of the repair insert 21 may be defined in the first dimension by sagittal planes 215 and 216 parallel to the X and Y axes 201 and 202, and (b) frontal planes 217 and 227 parallel to the X and Z axes 201 and 203.

It will be further seen that the rectangular shape of the upper portion 26 of the repair insert 21 may be defined in the second dimension by (a) transverse planes 224 and 225 parallel to the Y and Z axes 202 and 203, and (b) frontal planes 223 and 227 parallel to the X and Z axes 201 and 203. Still further, it will be seen that the rectangular shape of the upper portion 26 of the repair insert 21 may be defined in the third dimension by (a) transverse planes 224 and 225 parallel to the Y and Z axes 202 and 203, and (b) sagittal planes 215 and 216 parallel to the X and Y axes 201 and 202.

The upper insert portion 26 thus has a substantially uniform (a) upper insert portion width, (b) upper insert portion length, and (c) upper insert portion depth and thus may be defined by being rectangular in the first, second, and third dimensions or cuboidal as bound by the aforementioned planes. The lower insert portion 27 preferably comprises (a) a head-forming insert structure or portion as at 90 and (b) a web-forming insert structure or portion as at 91.

The head-forming insert structure or portion 90 preferably comprises (i) a substantially uniform head-forming insert portion width bound by sagittal planes 215 and 216 in the first dimension, and (ii) a decremental head-forming insert portion length (i.e. a length that continually decreases) bound by oblique planes 221 and 222 in the second dimension. The web-forming insert structure 91 preferably comprises (i) a decremental web-forming insert portion width intermediate sagittal planes 215 and 216 inwardly toward planes 219 and 220 at an upper portion thereof, (ii) a substantially uniform web-forming insert portion width intermediate planes 219 and 220 at a lower portion thereof, and (iii) a decremental web-forming insert portion length bound by oblique planes 221 and 222.

The rail head portion 14 preferably comprises a maximum head width as at 23 intermediate sagittal planes 206 and 207, and the rail web portion 13 preferably comprises a substantially uniform web width as at 29 intermediate sagittal planes 211 and 212. The upper insert portion width (as at 22) is preferably (i) equal in magnitude to the head-forming insert portion width, but (ii) greater in magnitude relative to 1) the web-forming insert portion width 28 and 2) the head width 23. The web-forming insert portion width 28 is preferably (i) lesser in magnitude than the head width 23 and (ii) greater in magnitude than the web width 29.

Figure 9:
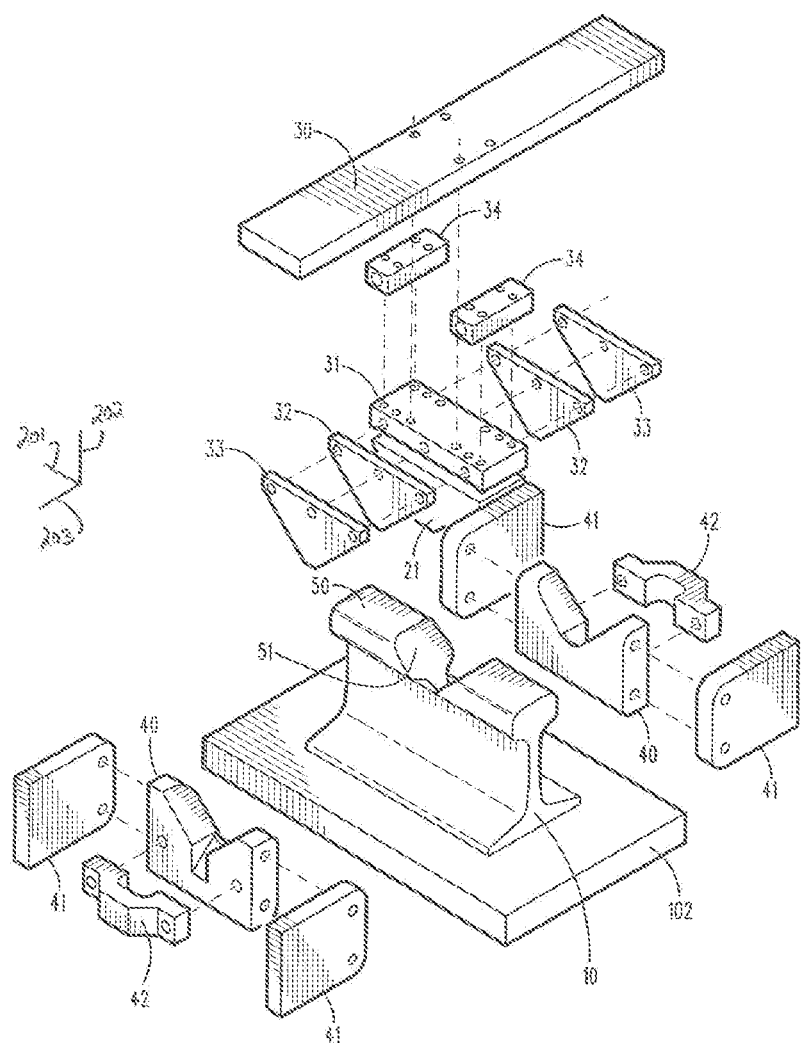
FIG. 9 is a top exploded perspective view of the structural elements otherwise depicted in FIGS. 5 and 6.
Figure 10:
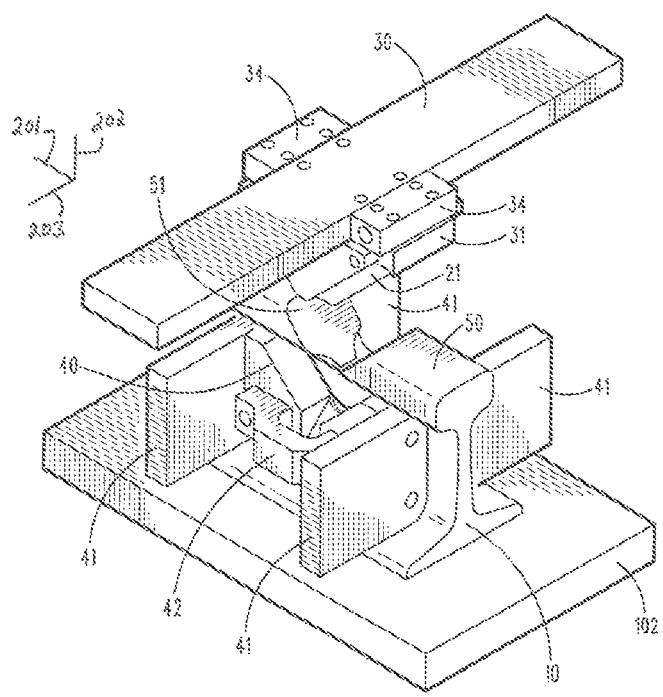
FIG. 10 is a top perspective view of the structural elements otherwise depicted in FIGS. 5 and 6, which elements are shown in assembled form.
Figure 11:
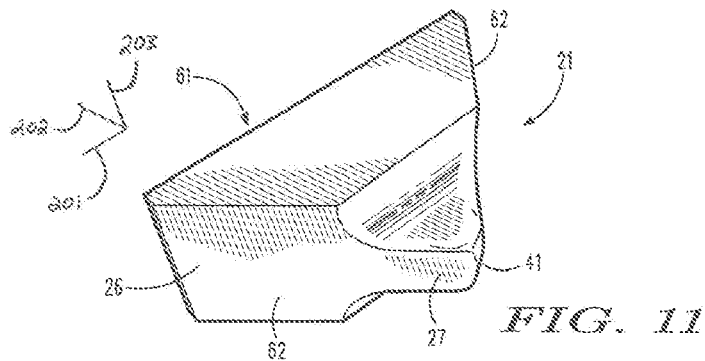
FIG. 11 is a bottom perspective view of an exemplary repair insert according to the present invention.

FIG. 9 depicts an exploded perspective view of a test weld scenario showing the primary components that enable the present methodology. In this regard, the preferred system and/or method essentially employs a current-conductive, insert-side bus assembly for interfacing with the repair insert 21 and a current-conductive, rail-side bus assembly for interfacing with the rail length 10.

The insert-side bus assembly preferably comprises a top bus bar as at 30, a wedge or insert block as at 31, a pair of inner, opposed wedge or insert side plates as at 32, a pair of outer side plates as at 33, and a pair of cooling blocks as at 34. Cooling blocks 34 can be moved to achieve strategic cooling of the tooling and/or weld.

Opposite the insert-side bus assembly is positioned a rail-side bus assembly (or assemblies). The rail length 10 is supported in FIGS. 5-10 by a generic support plane or structure as referenced at 102. The rail-side bus assembly preferably comprises laterally-opposed, web-engaging rail bus elements as at 40 each of which is engaged with (a) opposed rail bus side plates as at 41 and (b) a rail bus bridge as at 42. FIGS. 7 and 8 depict current 100 being driven through the bus assemblies via the repair insert 21, the rail length 10, and the structure-to-insert interface or rail-to-insert interface 101.

A so-called flash butt weld cycle typically comprises three phases, namely, a pre-heating phase, a flashing phase, and an upsetting or forging phase by way of varied amperages ranging anywhere from 22,000 amps to 47,000 amps. Excellent results, for example, have been achieved by using an electric current during (1) the pre-heating phase between 32,000 and 42,000 amps, (2) the flashing phase between 27,000 and 37,000 amps, and (3) the upsetting phase between 30,000 and 44,000 amps. The nominal flashing voltage is best at about seven to ten volts, and the nominal upsetting distance is best at about 0.375 to 1.00 inch. The foregoing amperages, voltages, and distances are exemplary and not limiting.

Figure 16:
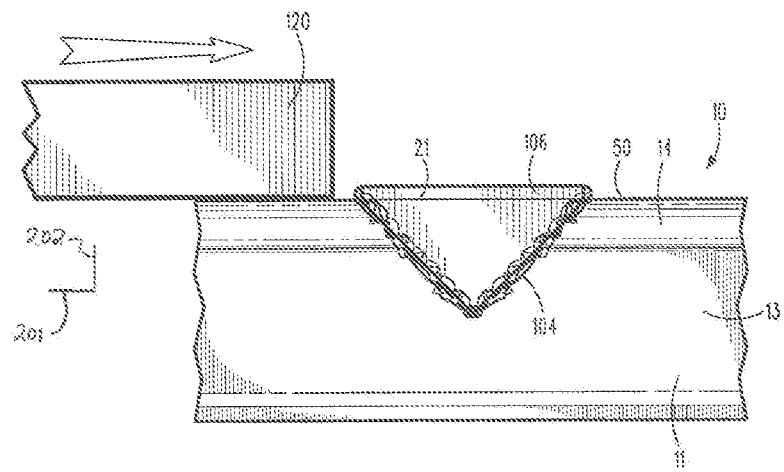
FIG. 16 is a side view of (1) the repair insert as inserted into and welded to the void site after the weld cycle has completed, and (2) a generic shear die cutting element removing excess insert, rail, and flash material from the fragmentary rail length.
Figure 17:
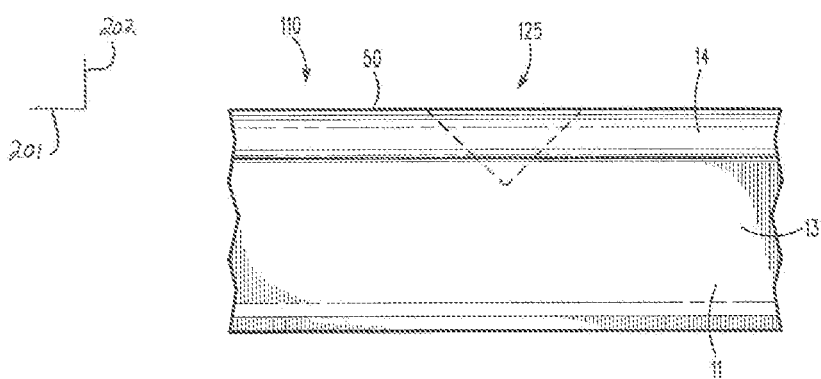
FIG. 17 is a side elevational view of a fragmentary rail length having a finished repair site, which repair site is marked with thin broken lines.

Resistance from the current 100 being driven through the structures heats the interface 101, and the repair insert 21 is thus flash-welded to the rail length 10 at the void site 20 as generically depicted at "flashing" 105. This has the effect of forming an oxide-free, clean junction between the repair insert 21 and the rail length 10 as the respective surfaces of the repair insert 21 and rail length 10 are forced out the sides of the junction or rail-to-insert interface 101. FIG. 16 depicts the noted/described excess flash material as referenced at 104.

The reader will further note from an inspection of FIGS. 7 and 8 that a significant force 103 is directed into the structures such that the repair insert 21 is forced against the rail length 10 at the void site (elsewhere referenced at 20). The ensuing/attendant heat and force 103 further cause the repair insert 21 to be forge-welded to the rail length 10 at the rail-to-insert interface 101, during which atomic structure of the rail length 10 and repair insert 21 interdiffuse to cause a robust, solid-state weld at the rail-to-insert interface 101.

As earlier introduced, the reader will note that the wedge-shaped void site 20 and wedge-shaped repair insert 21 provide an angled rail-to-insert interface 101. It is contemplated that a significant benefit is achieved by way of the angled rail-to-insert interface 101. For example, the reader will note that force 103 is directed in a first (or downward) direction as depicted in the drawings. The angled rail-to-insert interface 101 is bound on the rail side by rail structure along its entire length 39 for opposing force 103 as delivered to the rail length 10 via repair insert 21. The repair inset 21 thus transfers force 103 along that portion of length 39 in contact with the rail length 10.

Figure 18:
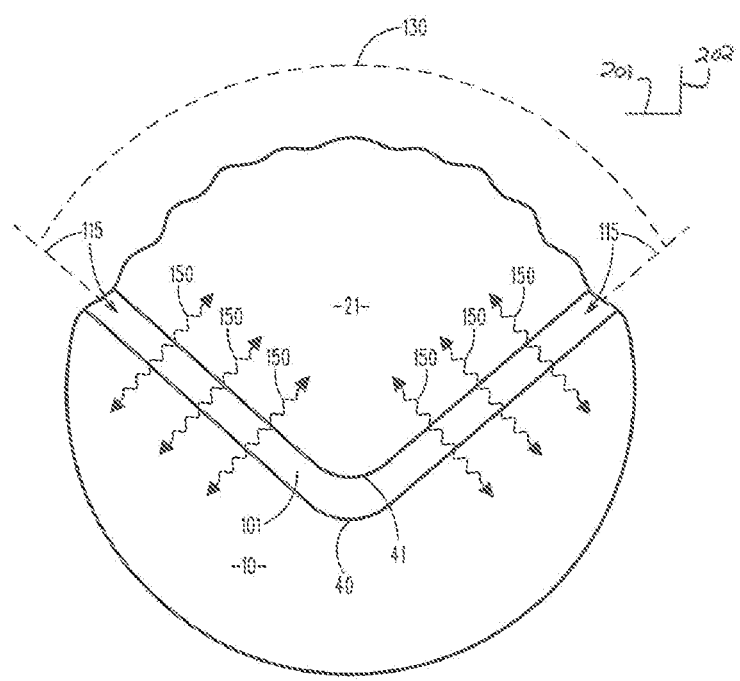
FIG. 18 is an enlarged fragmentary diagrammatic depiction of the rail-to-insert interface having an exaggerated gap and showing orthogonally opposed planes of the interface extending from a beveled junction.
Figure 19:
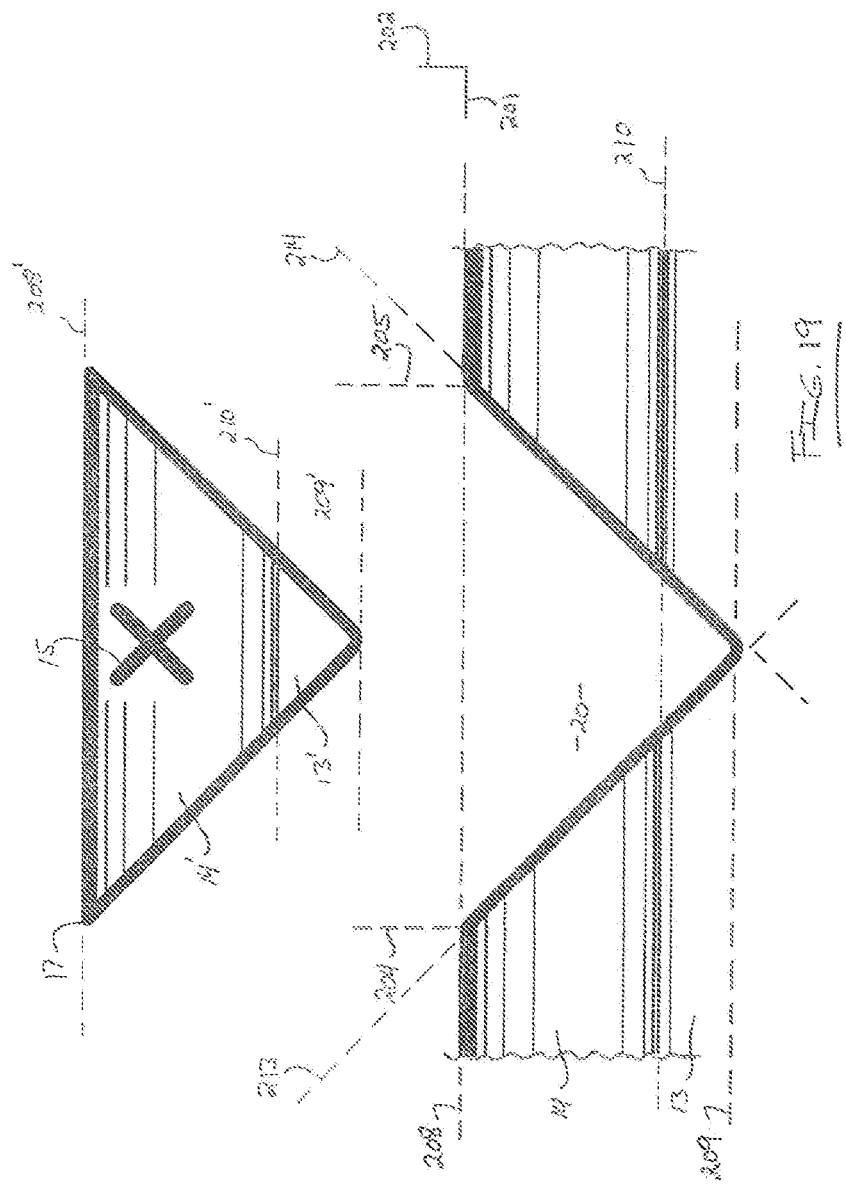
FIG. 19 is an enlarged fragmentary side elevational depiction of the fragmentary rail length showing the marked volumetric upper rail portion being removed as otherwise depicted in reduced form in FIG. 4.
Figure 20:
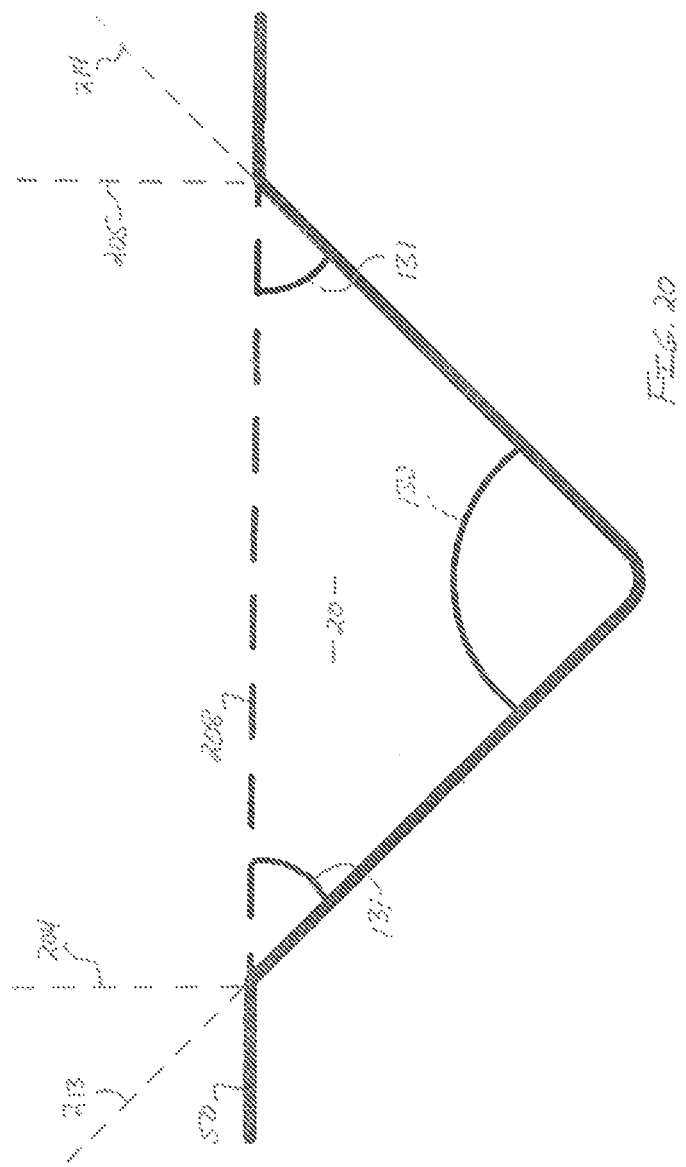
FIG. 20 is an enlarged fragmentary side elevational view depicting the angled surfaces of the void site with a beveled valley therebetween as otherwise depicted in reduced form in FIG. 4(a).
Figure 21:
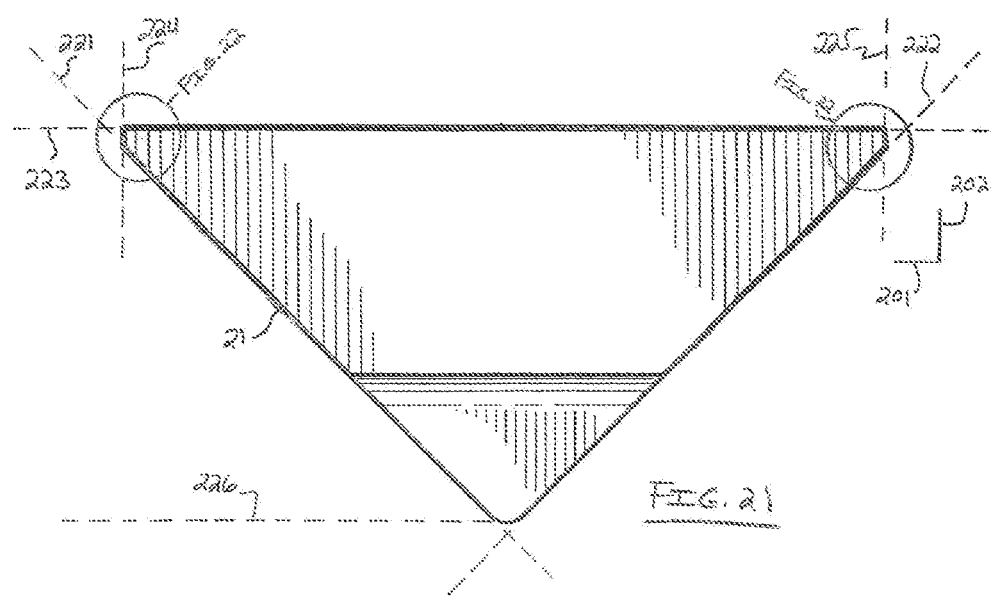
FIG. 21 is an enlarged side view of the exemplary repair insert otherwise depicted in FIG. 13.

Excellent results have been achieved when forming a 90 degree angle (as at 130 in FIGS. 4(a) and 18) at the void site 20 and repair insert 21. It is contemplated that the orthogonal relationship between opposing planes 115 of the interface 101 structurally function to enhance uniform heat distribution (as diagrammatically depicted at 150 in FIG. 18) and minimize material entrapment during the welding process.

Further, the valley 40 of the void site 20 and the tip 41 of the insert 21 are preferably beveled or rounded for further minimizing material entrapment during the welding process. Excellent results have been achieved when the radii of curvature of the beveled structures 40 and 41 are on the order of 0.25 inch. Other insert geometry is believed inferior for achieving the desired result as compared to the geometry shown in the various illustrations.

FIGS. 11-15(a) depict the preferred geometry of the repair insert 21. It will be recalled that before the welding cycle begins, the repair insert 21 has a pre-determined geometry such that the upper width 22 of the repair insert 21 is of slightly greater magnitude than the rail head width 23. It is contemplated that the upper insert width 22 should be slightly larger widthwise relative to the rail head 14 as generally depicted to compensate for slight lateral shift under load 103. Further, it will be noted that the depth 19 of insert 21 is significantly greater in magnitude than the depth 24 of the void site 20.

During the welding cycle, material from elements 10 and 21 are consumed such that the volumetric geometry of repair insert 21 is reduced as may be understood from a comparative inspection of FIGS. 13 versus 16. The flash material 104 and excess insert material 106 is then removed (e.g. by grinding, machining, and/or sheering) after the weld cycle (and optional quench cycle).

The repair insert 21 preferably further comprises an upper head-approximating portion 26 and a lower web-approximating portion 27, however as a means to reduce the excess material as exemplified by material(s) 104 and 106 after the weld cycle. In this regard, it is contemplated that the upper head-approximating portion 26 preferably comprises a width 22 slightly larger than the rail head width 24, and the lower web-approximating portion 27 comprises a width 28 of slightly greater magnitude than the web width 29.

Notably, the maximal transverse cross-sectional insert area as generally depicted at 112 is preferably beveled as at 42 intermediate said upper insert portion width 22 and said lower insert portion width 28. In this regard, it is contemplated that the beveled structures 42 approximate beveled structures 32 intermediate the rail head 14 and the rail web 13 and thereby effectively function to minimize excess material after the weld cycle.

After the weld and optional heat treat cycles, the rail with welded insert site is finished by removing the flash and excess materials 104 and 106, for example by shear die cutting the excess from the rail 10 as generically depicted at 120. The finished, repaired rail length 110 thus comprises a virtually seamless repair site 125, which repair site 125 was effected by robust weld processes per the present methodology.

Notably, the method of rail repair described hereinabove is also useful as a method of managing the neutral rail temperature (NRT). When the rail 10 is first installed the environmental conditions are within a selected range. These environmental conditions are recorded and the initial NRT is established. When a portion of rail 10 is replaced by a new material, such as thermite or a rail segment or plug, the NRT must then be recalculated and tracked. By virtue of not maintaining a continuous rail during the described method, the initial NRT is maintained.

While specific embodiments of the invention have been described in detail, it will be appreciated by those skilled in the art that various modifications and alternatives to those details could be developed in light of the overall teachings of the disclosure. For example, the method of rail repair may be said to essentially apply to a rail 10 having upper and lower rail sections, which upper rail may well comprise the rail head 14 and a(n upper) portion of the rail web 13, whereas the lower rail section may be said to comprise the rail base 11 and a (lower) portion of the rail web 13.

Further, the method may be said to essentially comprise the steps of initially identifying and locating a defect in a first select rail section, which first select rail section may be selected from the group consisting of the upper and lower rail sections. After a defect 15 is located, a volumetric portion (as at 17) of the rail 10 may then be removed from the first select rail section, which volumetric portion 17 includes or contains the defect 15.

By way of removal of the volumetric portion 17, a void site 20 is exposed in the first select rail section and a pre-formed metal insert 21 may be placed into the void site 20, thereby effecting a rail-to-insert interface as at 101. Current 100 may then be driven across or through the rail-to-insert interface 101 thereby heating the rail 10 and insert 21 at the rail-to-insert interface 101 via resistance of the driven current 100, which heat operates to effectively resistance-weld the insert 21 to the rail 10.

Notably, the continuity of a second select rail section is maintained while exposing the void site, which second select rail section is also selected from the group consisting of the upper and lower rail sections, but which second select rail section is opposite the first select rail section. Further, as noted, the void site 20 has a maximal transverse cross-sectional site area as generally referenced at 111 and the insert 21 has a maximal transverse cross-sectional insert area as generally referenced at 112. Said insert area 112 is preferably greater in magnitude than said site area 111, but approximate thereto so as to minimize the volume of excess material that must be removed during the finishing step(s).

The method may be said to further comprise the steps of forcing the insert 21 against the rail 10 while driving current across the rail-to-insert interface 101; removing oxides from the rail-to-insert interface 101 during the step of flash welding the insert 21 to the rail 10; and interdiffusing atomic structure of the rail 10 and insert 21 across or through the rail-to-insert interface 101 while forge welding the insert 21 to the rail length 10.

The foregoing methods are believed to systemically follow from the underlying rail and repair insert combination, which combination may be said to comprise a certain rail length 10 and a repair insert as at 21. The rail length 10 as generally depicted throughout the illustrations has a rail head portion 14, a rail web portion 13, a rail base portion 11, and a void site 20 formed therein to remove a rail defect 15. The void site 20 is located intermediate the rail length and preferably extends into the rail head and web portions 14 and 13. The void site 20 has a maximal site depth as at 24 and a maximal site length as at 39.

The repair insert 21 is insertable into the void site 20 for effecting a rail-to-insert interface as at 101. The repair insert 21 comprises an upper insert portion 26, a lower insert portion 27, a maximal insert depth as at 19, and a maximal insert length as at 38. The insert depth 19 is greater in magnitude than the site depth 24 and the insert length 38 is greater in magnitude than the site length 39. Both the rail length 10 and the repair insert 21 are preferably formed from weldable materials and are thus weldable to one another substantially as described hereinabove, although other solid state welding techniques such as friction welding and brazing are contemplated.

Notably, the void site 20 preferably has a wedge-shaped, longitudinal site cross-section as generally depicted in FIGS. 4 and 6; and the repair insert 21 preferably has a wedge-shaped, longitudinal insert cross-section as generally depicted in FIGS. 12 and 13. The wedge-shaped longitudinal site and insert cross-sections preferably comprise substantially 90 degree angles 130 at the rail-to-insert interface 101, and respectively comprise a beveled valley as at 40 and tip as at 41 for minimizing material entrapment during the welding process.

From a comparative inspection of FIGS. 15(a)-15(c), it will be seen that the upper insert portion 26 preferably comprises a substantially uniform upper insert portion width as at 22, the lower insert portion 27 has a substantially uniform lower insert portion width as at 28, the rail head portion 14 has a maximum head width as at 23, and the rail web portion 13 has a substantially uniform web width as at 29.

The upper insert portion width 22 is preferably greater in magnitude relative to the lower insert portion width 28 and the head width 23. The lower insert portion width 28 is preferably lesser in magnitude than the head width 23, but greater in magnitude than then web width 29. The maximal transverse cross-sectional insert area 112 is preferably beveled intermediate said upper insert portion width 22 and said lower insert portion width 28.

Accordingly, although the invention has been described by reference to certain preferred and alternative embodiments and methodologies, it is not intended that the novel disclosures and methods herein presented be limited thereby, but that modifications thereof are intended to be included as falling within the broad scope and spirit of the foregoing disclosure, the following claims and the appended drawings.

We claim:

1. A rail and repair insert combination, said combination comprising:
    a rail length, the rail length having a rail head portion, a rail web portion, a rail base portion, and a void site, the void site being located within the rail length and extending into the rail head portion, the void site having a maximal site depth, a maximal site width, and a maximal site length; and
    a repair insert, the repair insert being insertable into the void site for effecting a rail-to-insert interface, the repair insert comprising an upper insert portion and a lower insert portion, the lower insert portion comprising a maximal insert depth, a maximal insert width, and a maximal insert length, said insert depth being greater in magnitude than said site depth, said insert width being greater than said site width, and said insert length being greater in magnitude than said site length.

2. The combination of claim 1 wherein the rail and repair insert are formed from weldable materials, the rail and repair insert thus being weldable to one another.

3. The combination of claim 2 wherein the void site has a triangular, sagittal-longitudinal site cross-section and the repair insert has a triangular, sagittal-longitudinal insert cross-section.

4. The combination of claim 3 wherein said triangular sagittal-longitudinal site and insert cross-sections comprise substantially 90 degree angles at the rail-to-insert interface, the 90 degree angles at the rail-to-insert interface for enhancing uniform heat distribution and minimizing material entrapment during welding processes.

5. The combination of claim 4 wherein said triangular sagittal-longitudinal site and insert cross-sections respectively comprise a beveled valley and beveled tip, the beveled valley and tip for minimizing material entrapment during welding processes.

6. The combination of claim 5 wherein the void site extends into the rail web portion, the void site having a T-shaped transverse site cross-section, the repair insert comprising a T-shaped transverse insert cross-section.

7. The combination of claim 6 wherein the void site has a maximal transverse cross-sectional site area and the insert has a maximal transverse cross-sectional insert area, the maximal transverse cross-sectional insert area being greater in magnitude relative to the maximal transverse cross-sectional site area.

8. The combination of claim 7 wherein said maximal transverse cross-sectional insert area is minimized relative to said maximal transverse cross-sectional site area.

9. The combination of claim 8 wherein (1) the upper insert portion has a substantially uniform (a) upper insert portion width, (b) upper insert portion length, and (c) upper insert portion depth, (2) the lower insert portion has (a) a head-forming insert structure and (b) a web-forming insert structure, the head-forming insert structure having (i) a substantially uniform head-forming insert portion width, and (ii) a decremental head-forming insert portion length, the web-forming insert structure having (i) a decremental web-forming insert portion upper width, (ii) a substantially uniform web-forming insert portion lower width, and (iii) a decremental web-forming insert portion length, the rail head portion has a maximum head width, and the rail web portion has a substantially uniform web width, said upper insert portion width being (i) equal in magnitude to the head-forming insert portion width and (ii) greater in magnitude relative to 1) said web-forming insert portion width and 2) said head width, said web-forming insert portion width being (i) lesser in magnitude than said head width and (ii) greater in magnitude than said web width.

10. The combination of claim 9 wherein the maximal transverse cross-sectional insert area is beveled intermediate said head-forming insert portion width and said web-forming insert portion width.

11. A solid state weld repair insert for use in repairing a targeted metallic structure having transversely widthwise-distinguishable first and second structural sections, the first structural section having an outer surface opposite the second structural section and a void site extending into at least the first structural section from the outer surface toward the second structural section, the void site having a maximal site depth and a maximal site length, the repair insert being insertable into the void site for effecting a structure-to-insert interface, the repair insert comprising transversely widthwise distinguishable first and second insert portions, a maximal insert depth, and a maximal insert length, said insert depth being greater in magnitude than said site depth, said insert length being greater in magnitude than said site length.

12. The repair insert of claim 11 wherein the metallic structure and repair insert are formed from weldable materials, the metallic structure and repair insert thus being weldable to one another.

13. The repair insert of claim 12 wherein the void site of the metallic structure has a triangular, sagittal-longitudinal site cross-section and the repair insert has a triangular, sagittal-longitudinal insert cross-section.

14. The repair insert of claim 13 wherein said triangular sagittal-longitudinal site and insert cross-sections comprise substantially 90 degree angles at the structure-to-insert interface for enhancing uniform heat distribution and minimizing material entrapment during welding processes.

15. The repair insert of claim 14 wherein said site and insert cross-sections respectively comprise a beveled valley and a beveled tip for minimizing material entrapment during welding processes.

16. The repair insert of claim 12 wherein the void site is formed in a targeted rail structure having rail head, web, and base portions, the void site extending into the rail head and web portions, the void site having a T-shaped transverse site cross-section, the repair insert comprising a T-shaped transverse insert cross-section.

17. The repair insert of claim 16 wherein the void site has a maximal transverse cross-sectional site area and the insert has a maximal transverse cross-sectional insert area, the maximal transverse cross-sectional insert area being greater in magnitude relative to the maximal transverse cross-sectional site area.

18. The repair insert of claim 17 wherein said maximal transverse cross-sectional insert area is minimized relative to said maximal transverse cross-sectional site area.

19. The repair insert of claim 18 wherein (1) the first insert portion has a substantially uniform (a) first insert portion width, (b) first insert portion length, and (c) first insert portion depth, (2) the second insert portion has (a) a head-forming insert structure and (b) a web-forming insert structure, the head-forming insert structure having (i) a substantially uniform head-forming insert portion width, and (ii) a decremental head-forming insert portion length, the web-forming insert structure having (i) a substantially uniform web-forming insert portion lower width, and (ii) a decremental web-forming insert portion length, the rail head has a maximum head width, and the rail web has a substantially uniform web width, said first insert portion width being (i) equal in magnitude to the head-forming insert portion width and (ii) greater in magnitude relative to 1) said web-forming insert portion width and 2) said head width, said web-forming insert portion width being (i) lesser in magnitude than said head width and (ii) greater in magnitude than said web width.

20. The rail repair insert of claim 19 wherein the maximal transverse cross-sectional insert area is beveled intermediate said head-forming insert portion width and said web-forming insert portion width.

21. A rail and repair insert combination, said combination comprising:
a rail length, the rail length having an upper rail surface, a rail head portion, a rail web portion, a rail base portion, and a void site, the void site being located within the rail length and extending at least into the rail head portion from the upper rail surface, the void site being T-shaped in a first dimension, triangular in a second dimension, and rectangular in a third dimension, the void site having varied site widths in the first dimension, a maximal site depth in the first and second dimensions, and a maximal site length in the second dimension; and
a repair insert, the repair insert being insertable into the void site for effecting a rail-to-insert interface, the repair insert being T-shaped in the first dimension, triangular in the second dimension, and rectangular in the third dimension and comprising an upper insert portion, a lower head-forming insert portion, a lower web-forming insert portion, varied insert widths in the first dimension, a maximal insert depth in the first and second dimensions, and a maximal insert length in the second dimension, said varied insert widths being respectively greater than said site widths, said insert depth being greater in magnitude than said site depth, and said insert length being greater in magnitude than said site length.

22. The combination of claim 21 wherein the upper insert portion is rectangular in the first, second and third dimensions, the upper insert portion thus being cuboidal, the cuboidal upper insert portion for enhancing transmission of energy into the repair insert at the upper insert portion.

23. The combination of claim 22 wherein the triangular dimension of the insert and void site each comprise a beveled interface vertex, the beveled interface vertex for minimizing material entrapment during welding processes.

24. A solid state weld repair insert for use in repairing a targeted metallic structure having first and second structural sections, the first structural section having an outer surface opposite the second structural section and a void site extending into at least the first structural section from the outer surface toward the second structural section, the void site being T-shaped in a first dimension, triangular in a second dimension, and rectangular in a third dimension, said void site having a maximal site depth in the first and second dimensions and a maximal site length in the second dimension, the repair insert being T-shaped in the first dimension, triangular in the second dimension, and rectangular in the third dimension, said insert being insertable into the void site for effecting a structure-to-insert interface, the repair insert comprising first and second insert portions, a maximal insert depth in the first and second dimensions, and a maximal insert length in the second dimension, the second insert portion having a head-forming insert portion and a web-forming insert portion, the head-forming and web-forming insert portions having varied insert widths, said insert depth being greater in magnitude than said site depth, said insert length being greater in magnitude than said site length.

25. The repair insert of claim 24 wherein the first insert portion is rectangular in the first, second and third dimensions, the first insert portion thus being cuboidal, the cuboidal first insert portion for enhancing transmission of energy into the repair insert at the first insert portion.

26. The repair insert of claim 25 wherein the triangular dimension of the insert and void site each comprise a beveled interface vertex, the beveled interface vertex for minimizing material entrapment during welding processes.

* * * * *